United States Patent [19]

Vlasak

[11] Patent Number: 5,070,932

[45] Date of Patent: Dec. 10, 1991

[54] THERMOSTAT WITH ENHANCED OUTDOOR TEMPERATURE ANTICIPATION

[75] Inventor: Robert C. Vlasak, Dallas, Tex.

[73] Assignee: Lennox Industries Inc., Carrollton, Tex.

[21] Appl. No.: 658,095

[22] Filed: Feb. 20, 1991

[51] Int. Cl.⁵ .................. F25B 29/00; G05D 23/30
[52] U.S. Cl. ........................ 165/29; 165/26; 236/68 B; 236/91 G; 337/377; 337/378
[58] Field of Search .............. 165/28, 29, 26; 236/68 B, 91 G; 337/377, 378

[56] References Cited

U.S. PATENT DOCUMENTS

| | | | |
|---|---|---|---|
| 2,183,874 | 12/1939 | Shivers | 236/68 B |
| 2,481,849 | 9/1949 | Lehane | 236/68 B |
| 2,556,973 | 6/1951 | Nickells | 236/68 B |
| 2,628,034 | 2/1953 | Ray | 236/91 G |
| 2,732,132 | 1/1956 | Hulett | 236/91 G |
| 2,969,916 | 1/1961 | Shegnem | 165/26 |
| 2,969,917 | 1/1961 | Nason | 236/91 G |
| 3,144,548 | 8/1964 | Seigel | 236/91 G |
| 3,948,438 | 4/1976 | Vlasak | 165/26 |
| 3,993,120 | 11/1976 | Iberg et al. | 165/26 |
| 4,114,681 | 9/1978 | Denny | 165/26 |
| 4,270,597 | 6/1981 | Denny | 165/29 |
| 4,598,764 | 7/1986 | Beckey | 165/29 |

Primary Examiner—John Ford
Attorney, Agent, or Firm—Allegretti & Witcoff, Ltd.

[57] ABSTRACT

A thermostat for controlling the temperature within a space to be conditioned includes a system mode selector switch for selecting one of the heating, cooling or off modes of operation and a blower mode selector switch for selecting an automatic (cycling) or continuous mode of operation for the blower for blowing air into the confined space. Within the thermostat are heating actuating switches for one or more stages with associated anticipators and a cooling actuating switch with associated anticipator. An ambient compensating thermistor and a fixed resistor in series therewith are associated with the thermostat. Enhanced outdoor temperature compensation is provided by an outdoor positive temperature compensating thermistor in series with a variable resistor, which are arranged in parallel with the fixed resistor.

12 Claims, 5 Drawing Sheets

TYPICAL ROOM THERMOSTAT
2 STAGE HEAT
ENHANCED OUTDOOR ANTICIPATION
MINIMUM O.D. TEMPERATURE = X
WHERE 30°F > X > -40°F
& A = (70 - X)/10

THERMOSTAT WITH ENHANCED OUTDOOR TEMPERATURE ANTICIPATION

BACKGROUND OF THE INVENTION

This invention pertains to room thermostats which are intended to control temperature within a confined space. More particularly, this invention pertains to an improved thermostat control system for a heating and/or cooling system.

Thermostats are designed to control temperature within a confined space. They typically consist of a temperature sensing device, usually a bi-metal member, an automatic switch, such as a mercury switch or switches mounted on the bi-metal member to control a heating and/or cooling system, and manual switches to select the operational mode (heat, cool, or off) and blower operation. Because of the necessary mass of the bi-metal member, it is slow to respond to rapid changes of the air temperature surrounding it. If left uncorrected, this will result in large oscillations of room temperature about the desired temperature setting.

This problem has been addressed in a relatively effective manner in the prior art. A resistor is thermally linked to the bi-metal member and when heat is added to the confined space, heat is simultaneously additionally added to the bi-metal member by electrically energizing the resistor. In this manner the bi-metal member of the thermostat "anticipates" the heating of the confined space and terminates the heating sooner than it otherwise would. The resistor thermally linked to the bi-metal member is commonly called an "anticipator". As the outdoor temperature decreases, the need for heat in the confined space increases and the bi-metal temperature increases above room temperature. In other words, the control temperature decreases because the bi-metal member is warmer than the space temperature. This results in a drop in room temperature or an effect called "droop". In a more sophisticated sense, droop is defined as the change in control temperature between 20 percent load (on time) and 80 percent load (on time). Droop is undesirable as it reduces the comfort of the inhabitants of the area to be conditioned. The discomfort effect is magnified by the normal reduction in humidity as the outdoor temperature decreases and is reflected in the confined space. My prior U.S. Pat. No. 3,948,438 granted Apr. 6, 1976 discloses a thermostat system which includes an anticipator capable of dissipating heat at a substantially constant rate over a range of applied voltages and current. The anticipator is made from a positive temperature coefficient material. However, U.S. Pat. No. 3,948,438 does not suggest the inventive thermostat with enhanced outdoor temperature anticipation of this invention.

A two-stage thermostat will typically control to over twice the change in room temperature as compared to a single stage thermostat. This is due to the required interstage differential and the change due to the droop in each stage.

The prior art has offered a partial solution to the problem of the change in control point which may be on the order of 8° F. One solution consists of an ambient compensating negative temperature coefficient (NTC) thermistor physically located in the outdoor ambient air (O.D.A.) and responsive to changes in that air temperature, and connected electrically in series with an outdoor ambient air fixed resistor thermally linked to the thermostat bi-metal member The NTC thermistor has a non-linear negative exponential resistance versus temperature characteristics to provide a large change in resistance for a narrow temperature change. The two devices in series, i.e., the NTC thermistor and the fixed resistor, are continuously powered by the 24 volt transformer. Theoretically, the thermostat bi-metal member then receives a lesser amount of heat from the fixed resistor as the anticipators add more heat with a decreasing outdoor ambient. The thermostat can be "off-calibrated" such that the thermostat will be in apparent calibration over the range of "percent heating capacity" required for comfort.

A large number of heat pumps are installed in climates with a minimum outdoor temperature (design temperature) on the order of 30° F., for example, in Florida or in Arizona. In such environments, there is not enough outdoor temperature change to effect an appreciable change in the resistance of the negative temperature coefficient (NTC) thermistor. In turn, it then cannot change appreciably the wattage in the fixed resistor, resulting in improper control.

Good design of heating and/or cooling equipment attempts to match the capacity of the heating and/or cooling equipment, e.g., heat pump, or perhaps furnace and air conditioner, with the calculated load as closely as possible. It is desired to minimize short cycling. An outdoor heat pump or air conditioner matched with a given indoor coil will remove a certain amount of moisture at a given air volume and return air dry/wet bulb temperature. It is important that the indoor air handler used provides the proper air flow volume. Further, the indoor air handler or blower fan should not move the air with excessive velocity, for then the inhabitant of the area being conditioned might be uncomfortable due to the draft.

Another important consideration is the thermostat setting and control for achieving comfort. For example, in an application where the humidity is high, a lower thermostat setting may be needed to remove enough moisture to obtain comfort conditions. This will allow the air conditioner to run longer and remove more moisture from the air. Raising the thermostat setting to reduce energy bills will result in high humidity if latent loads are high.

The present invention is intended to work well within the proper design considerations for a heating and/or cooling system or heat pump and to provide a thermostat with enhanced outdoor anticipation to provide comfort for the user, whether in a Northern clime in the United States, for example, where the minimum outdoor ambient is below zero degrees F. down to −40° F., or in a Southern clime in the United States, where the minimum outdoor ambient is on the order of 30° F.

An object of the present invention is to provide an improved thermostat which overcomes the noted disadvantages and deficiencies of prior thermostats.

Another object of the present invention is to provide an improved thermostat for a heat pump or for one, or two stage heating, one or two stage cooling applications having a positive temperature coefficient thermistor and a variable resistor in series with one another paralleling a fixed resistor within the thermostat, and these devices in series with a negative temperature coefficient thermistor, with the positive and negative temperature coefficient thermistors sensing the outdoor ambient temperature for providing a more reliable thermostat for a wide range of ambient conditions.

A further object of the present invention is to provide an improved thermostat for heat pumps or single or multi-stage heating and/or cooling systems which incorporates enhanced outdoor temperature anticipation to provide significantly enhanced comfort to the user. Other objects and advantages of the present invention will be made more apparent hereinafter.

BRIEF DESCRIPTION OF THE DRAWING

There is shown in the attached drawing a presently preferred embodiment of the present invention wherein like numerals refer to like elements in the various views and wherein.

DETAILED DESCRIPTION OF THE PRESENT INVENTION

Figure 1:
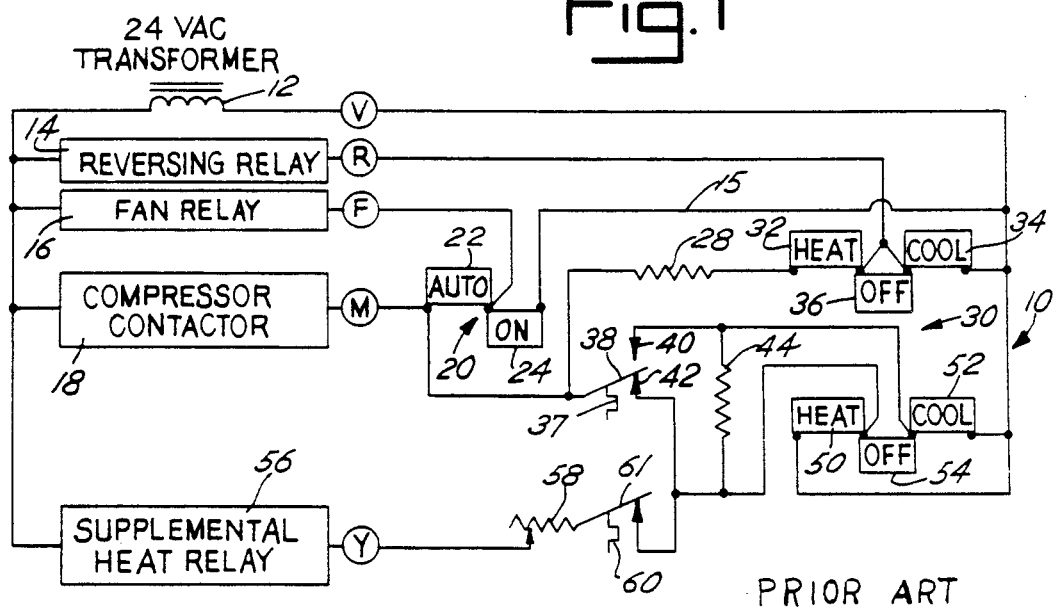
FIG. 1 is a schematic view of a prior art heat pump thermostat of the type to be improved upon by the present invention.
Figure 2:
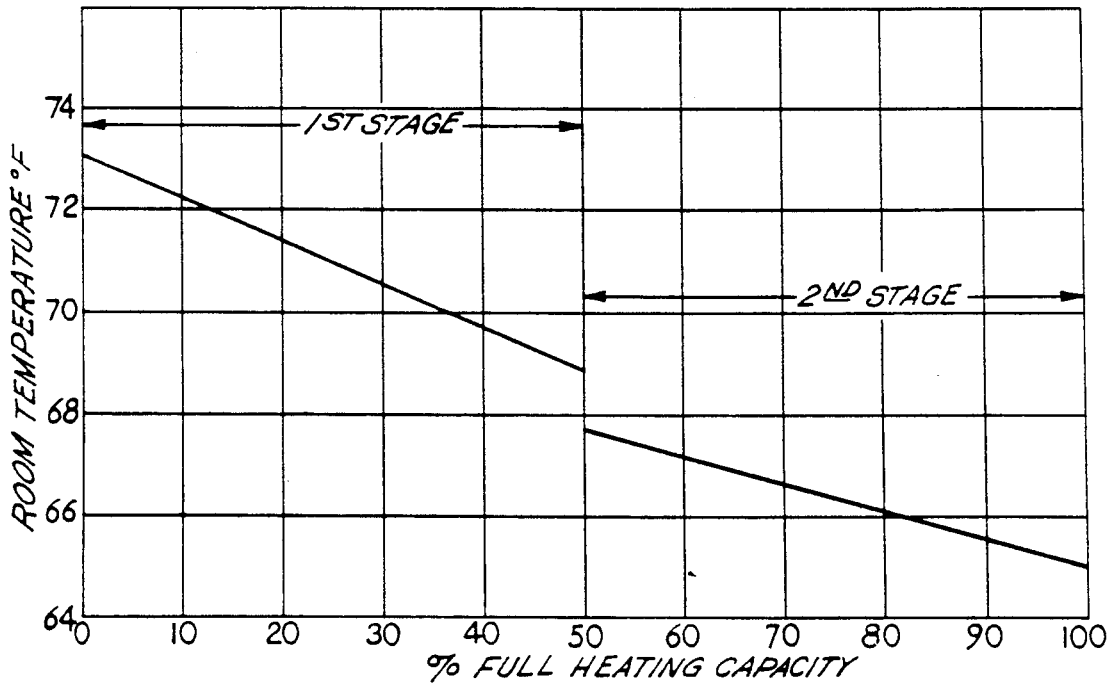
FIG. 2 is a graph representing the performance of the thermostat of FIG. 1.
Figure 3:
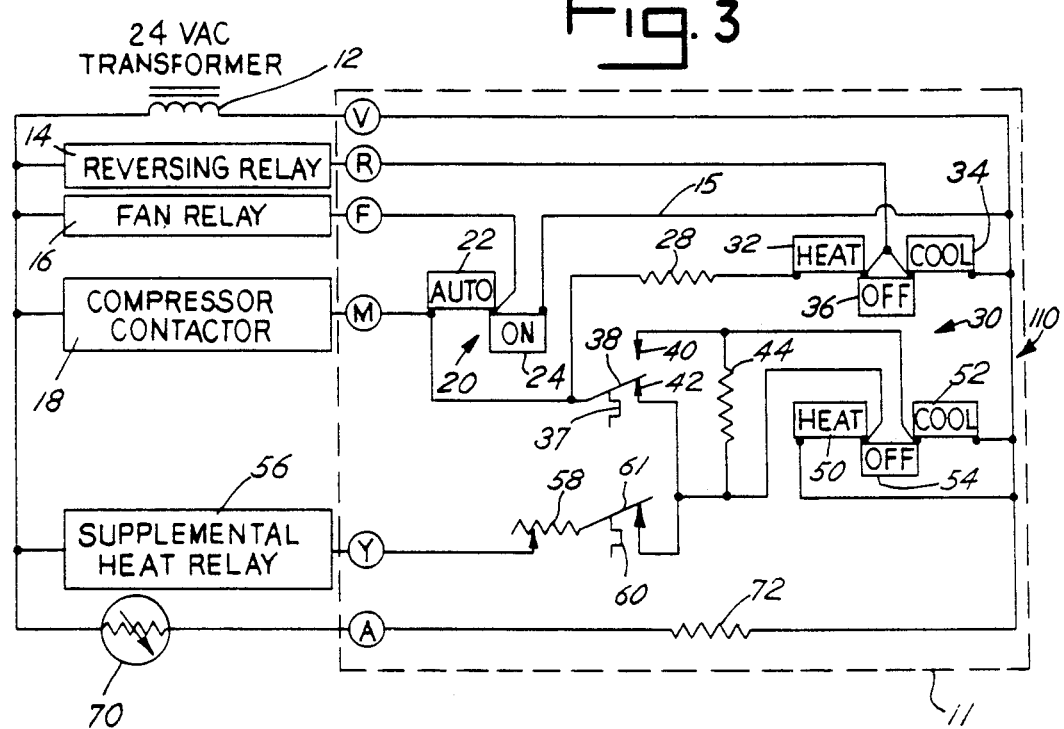
FIG. 3 is a schematic view of a prior art heat pump thermostat similar to FIG. 1, incorporating an ambient compensating thermistor in series with an outdoor air resistor.
Figure 4:
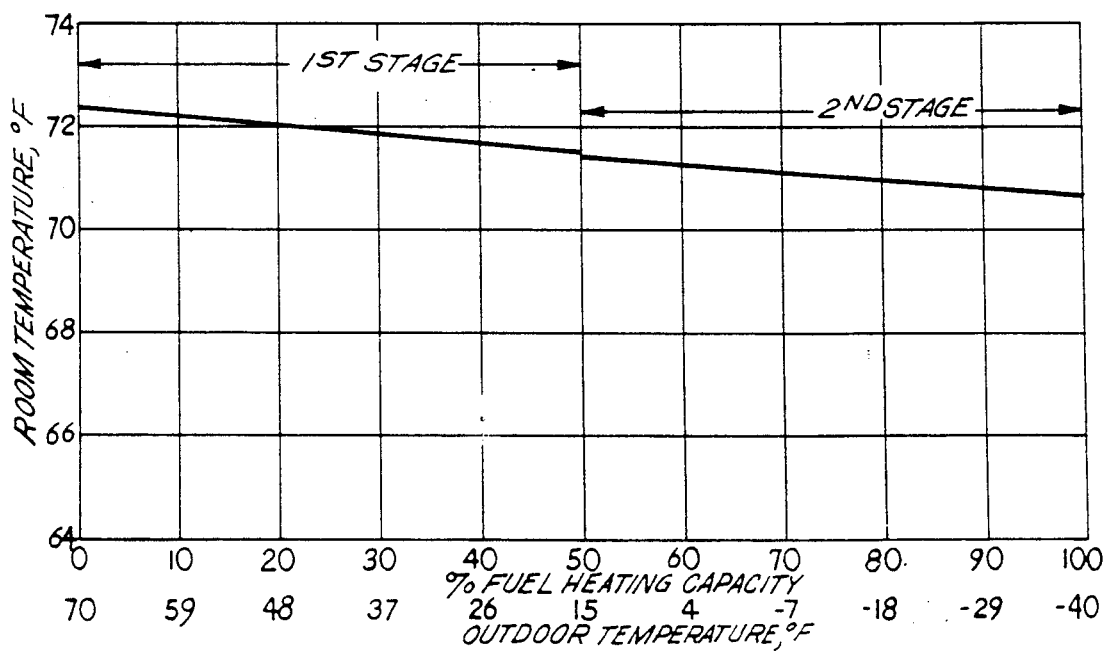
FIG. 4 is a graph representing the controlled room temperature over the range of 0 percent of heating capacity to 100 percent of heating capacity at an outdoor temperature of −40° F. for a prior art thermostat.
Figure 5:
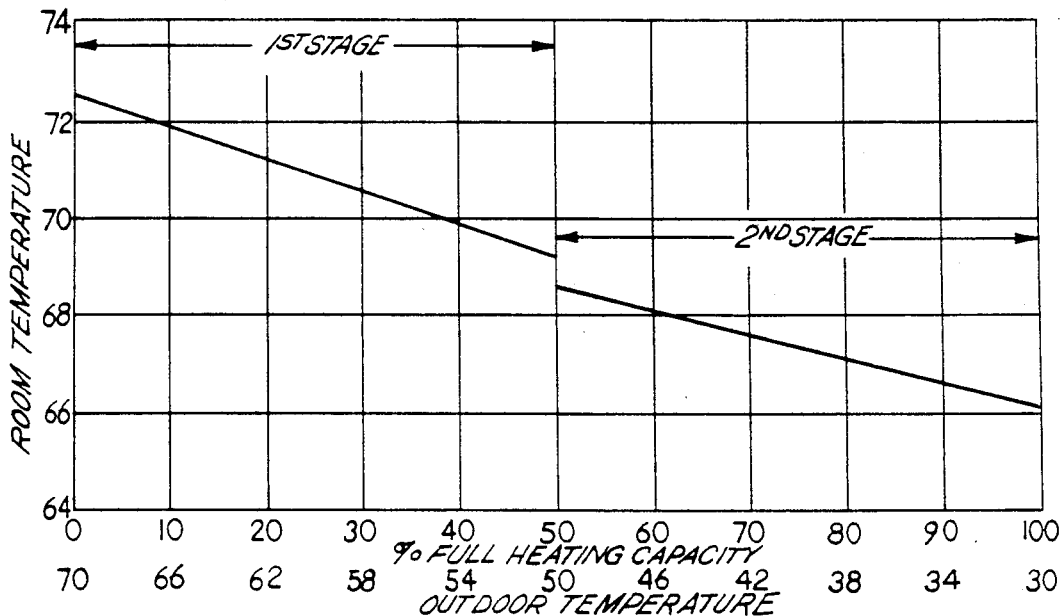
FIG. 5 is a graph representing the controlled room temperature over the range of 0 percent of heating capacity to 100 percent of heating capacity at an outdoor temperature of 30° F. for a prior art thermostat.

The present invention will be better understood by reference to the prior art schematic diagrams illustrated in FIGS. 1 and 3 and the graphs of FIGS. 2, 4 and 5. Turning to FIG. 1, there is shown a prior art thermostat of the type incorporating two-stages of heating and one stage of cooling. The thermostat 10, as shown may control a heat pump, although it will be understood that it could control a two-state heating, one-stage cooling system. Further, the thermostat could be adapted for any single or multi-stage heating and/or cooling system. As noted, the discussion of FIGS. 1–5 will deal with the prior art and will lay foundation for the invention described in FIGS. 6–10.

The thermostat 10 in FIG. 1 is powered from a 24 volt transformer 12. External to the housing 11 of the thermostat 10 is a reversing relay 14, a supplemental heat relay 56 a fan relay 16 and a compressor contactor 18. The reversing relay 14 operates the reversing valve (not shown) of the heat pump system which changes between the heating and cooling modes of operation. The fan relay 18 operates the blower motor (not shown). The compressor contactor 18 operates the compressor motor (not shown). The supplemental heat relay 56 operates the supplemental electric resistance heat.

The blower mode selector switch 20 is in circuit with the fan relay 16 for controlling operation of the blower in a cycling mode when the "auto" contact 22 is actuated to the closed position and in a continuous mode when the "on" contact 24 is actuated to the closed position. Selector switch 20 is a single pole, double throw switch. Disposed in line 26 which is connected at one end between the compressor contactor 18 and the "auto" contact 22 of the blower mode selector switch 20 is the first stage heat anticipator 28 and the system mode selector switch 30. The system mode selector switch 30, which is a two pole, triple throw switch, includes a heat contact 32, a cool contact 34, and an off contact 36. The off contact 36 is actuated to turn off both the heating and cooling systems. The heat contact 32 is actuated to initiate the heating mode of operation. The cool contact 34 is actuated to initiate the cooling mode of operation.

There is included in the circuit a bi-metal member 37 which actuates a mercury switch 38 that is movable between a first stage cooling contact 40 and a first stage heating contact 42. The circuit includes a cooling anticipation resistor 44. The switch 30 includes second contacts 52 and 54. It will be understood that the heating contacts 32 and 50 and the cooling contacts 34 and 52, as well as the off contacts 36 and 54 are mechanically interconnected for joint operation. Also included in the circuit is a supplemental heat relay 56 which is designed to operate the second stage of heating, for example, an electric strip heater. Connected in series with the supplemental heat relay 56 is a second stage heat anticipator 58 which cooperates with the second stage heat bi-metal 60, that actuates a mercury switch contact 61.

In operation, the blower mode selector switch 20 is operated to the "auto" or the "on" position and the fan or blower will either cycle if contact 22 is closed or will run continuously if contact 24 is closed. If cooling is desired the contacts 34 and 52 are closed. The reversing relay 14 will be actuated to switch to the cooling mode of operation since the circuit is completed to the reversing relay 14, line 15 and the contact 34 of the system mode selector switch 30. When the cooling switch contact 38 closes in response with demand for additional cooling the compressor contactor 18 will be actuated to energize the compressor. The cooling anticipator resistor 44 which is operatively associated with the bi-metal member 37 will provide the anticipation for the switch 38, which may be for example a mercury switch. If the temperature of the area to be conditioned is satisfied the switch 38 will be opened and the compressor contactor 18 will be de-energized, terminating compressor operation.

In the event that heating is desired, the heating contacts 32, 50 will be closed and the cooling contacts 34, 52 will be opened. Closure of the heating contact 32 will complete a circuit for the compressor contactor 18 through the line 26, the heat anticipator 28 and heating contact 32 to actuate the compressor. Anticipation heat for the mercury switch 38 is provided by the heat anticipator 28. Upon satisfaction of first stage heating, the bi-metal contact 38 will open and the compressor contactor 18 will be energized or activated. In the event that there is a requirement for additional heat than that provided by the first stage heating, then the second stage heating contact 60 will be closed and the supplemental heat relay 56 will be energized in order to activate the supplemental heater, for example, a resistance heater operatively associated with the room to be heated.

Turning to FIG. 2 there is shown a graph of the performance of the thermostat of FIG. 1 which includes two stage heating. Along the y-axis is the room temperature and along the x-axis is the percent of full heating capacity. In the graph shown, during first stage operation the room temperature control point will vary between 73° and 68.9° while operating in a range of 0 to fifty percent of full heating capacity. The second stage heating will be actuated at approximately 67.7° F. room temperature for fifty percent full heating capacity and function until about 64.9° F. at 100 percent capacity. It is to be noted that there is a change in control point for the space to be conditioned of approximately 8.1° F.

With reference to FIG. 3 there is illustrated a partial solution to the problem arising from the change in control point which may be in the order of 8° F. The schematic of FIG. 3 is substantially the same as the schematic of FIG. 1 with the exception that there is added to the thermostat 10 an ambient compensating thermistor 70 that is electrically connected in series with an outdoor ambient resistor 72. The outdoor ambient resistor 72 is normally fixed and in one embodiment may be 3.3K ohms. It is thermally linked to the thermostat bi-metal members. The ambient compensating thermistor 70 is normally a negative temperature coefficient (NTC) thermistor that is physically located within the outdoor ambient air and responds to changes in the outdoor ambient. The thermistor 70 provides a control for the fixed resistor 72 to help provide little anticipation heat at low outdoor temperatures and significant anticipation heat at high outdoor temperatures. The NTC thermistor 70 provides for a decrease in resistance with an increase in temperature. This is in contrast with a positive temperature coefficient thermistor which provides for increased resistance with an increase in temperature.

Theoretically the thermostat bi-metal member receives a lessor amount of heat from the fixed resistor 72 as the anticipators add more heat with a decreasing outdoor ambient. The thermostat 110 may be off calibrated such that the thermostat will be in apparent calibration over the range of percent heating capacity required for comfort.

Turning now to FIG. 4 there is illustrated the graph of a performance of a typical room thermostat with a two stage heating and the outdoor anticipation as shown for example in FIG. 3. In order to get the correction shown in FIG. 4, as compared to that in FI_. 2, a change of 110° F. is required in the outdoor temperature, that is, a change from 70° F. outdoor temperature to −40° F. outdoor temperature. Such typical room thermostat would probably function adequately in a temperature clime where outdoor temperatures on the order of 70° to −30° F. or −40° F. can be expected. However, if the thermostat is to be utilized with heat pumps installed in climates with a minimum outdoor temperature in the range of 30° F., then the performance of such thermostat would be as shown in FIG. 5. As seen from the graph of FIG. 5, the first stage will operate from 0 to 50 percent of full heating capacity over a temperature range of 72.5° F. at 0 percent full heating capacity to approximately 69.2° F. at 50 percent of full heating capacity. The second stage heating will function between approximately 68.6° at 50 percent heating capacity to approximately 66.1° F. at 100 percent capacity. Thus there is insufficient outdoor temperature change to effect an appreciable change in the resistance of the negative temperature coefficient thermistor. In turn there is no appreciable change in the wattage in the fixed resistor 72 in FIG. 3. The thermostat 110 will not provide desired comfort for the user in applications where the minimum outdoor design temperature is on the order of 30° F.

Figure 6:
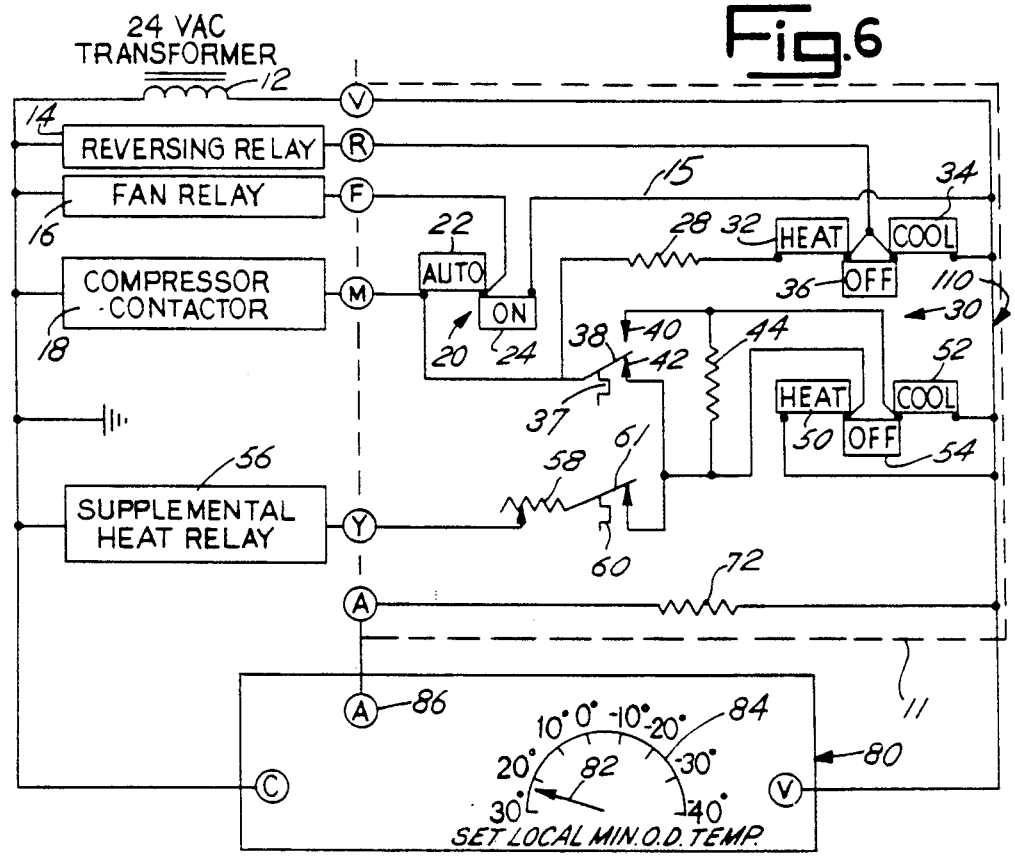
FIG. 6 is a schematic view of a thermostat like that of FIG. 3 incorporating the enhanced outdoor anticipation of the present invention.

Turning now to FIG. 6 there is illustrated an enhanced outdoor anticipation control 80 embodying the enhanced outdoor anticipation of the present invention. The thermostat 110 is similar to that of FIG. 3 and the same numerals are applied to the like components. The enhanced outdoor anticipation is provided by the addition of the inventive device 80. The enhanced outdoor anticipation control 80 includes sensors outdoors to sense ambient temperature. A single potentiometer 82 on a dial 84 on the enhanced outdoor anticipation control 80 provides for adjustment of the minimum local outdoor temperature. As shown, the minimum outdoor temperature may be set from 30° F. to −40° F. The electronics within the invention will change the output voltage indicated at terminal 86 to a value which is the same for identical percent loads for minimum outdoor temperatures in the range of 30° F. to −40° F.

Figure 7:
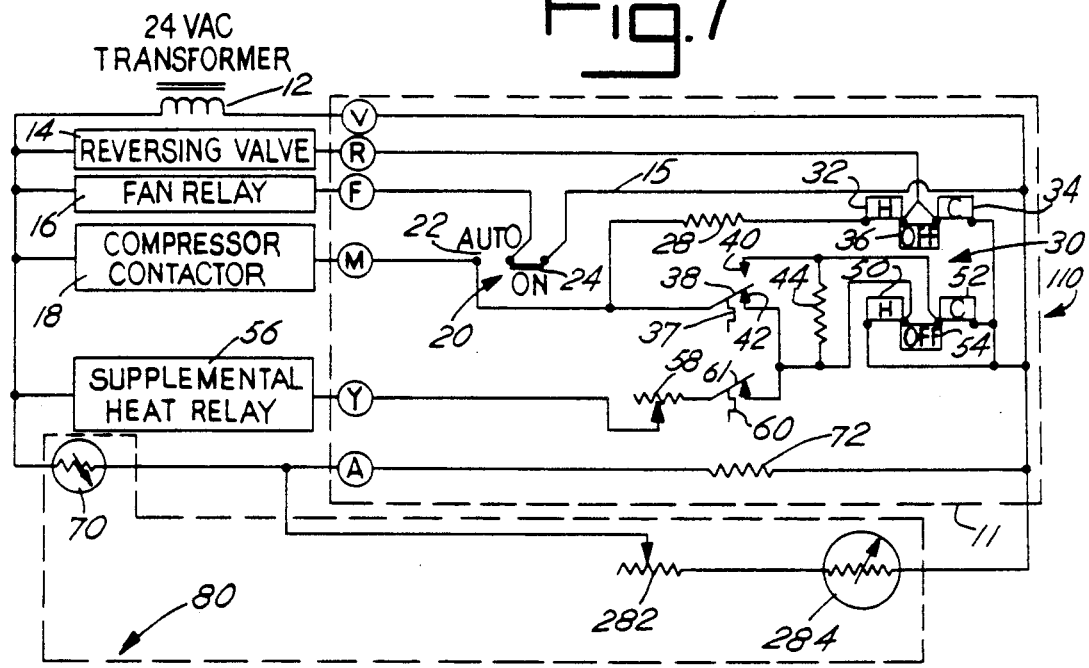
FIG. 7 is a schematic view of the thermostat of FIG. 6, illustrating the enhanced outdoor anticipation feature more fully.

With reference to FIG. 7, the specific implementation of the invention of FIG. 6 is provided by utilizing a variable resistor 282 which is adapted to be set upon rotation of the knob of the potentiometer 82 on the face of the control 80, and a positive temperature coefficient (PTC) thermistor 284 in series therewith. The variable resistor 282 and the positive temperature coefficient thermistor 284 are in parallel with the fixed resistor 72. The fixed resistor is an integral part of thermostat 110. The PTC thermistor 284, the NTC thermistor 70, and the variable resistor 282 are located in the outdoor ambient.

Figure 8:
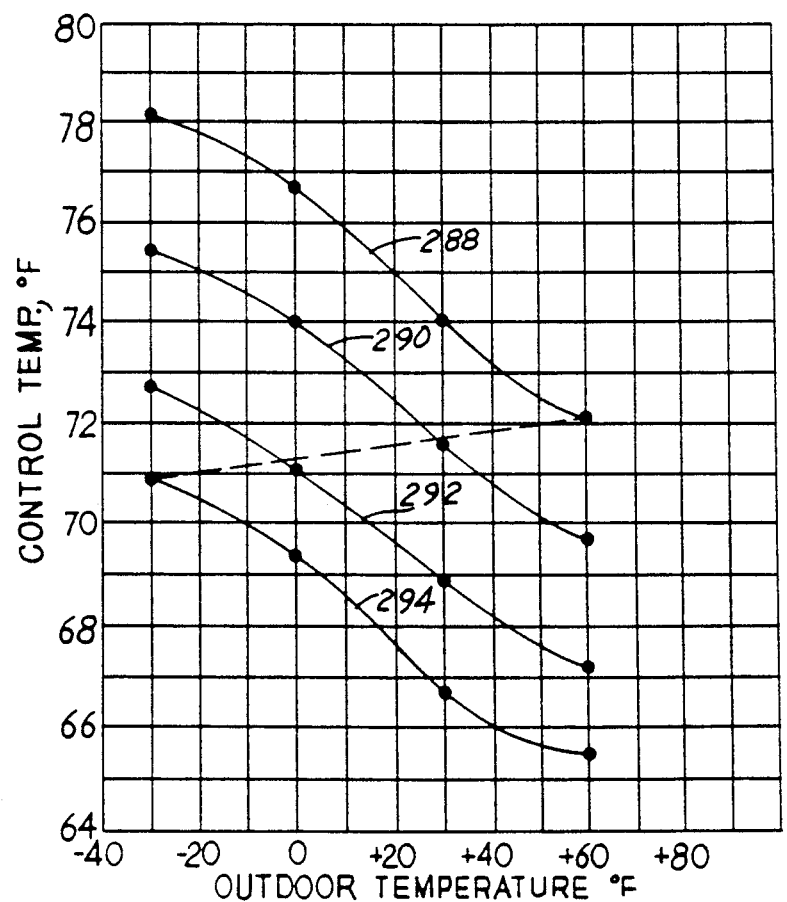
FIG. 8 is a graph representing the performance of the embodiment of FIG. 7 for given control temperatures and outdoor temperatures.

FIG. 8 is a graph plotting control temperature versus outdoor temperature for a heat pump with two stages of heating. The top curve 288 is a plot for 20 percent of load for the first stage of heating. The next curve 290 is a plot for 80 percent of load for the first stage of heating. The third curve 292 is a plot for 20 percent of load for the second stage of heating. The fourth curve is a plot for 80 percent of load for the second stage of heating. For the illustrated thermostat, the first curve 288 ends at 60° F. outdoor temperature, which corresponds to a control temperature of about 72° F. At −30° F. outdoor temperature, the fourth curve 294 corresponds to a control temperature of about 71° F. Over the operating range of twenty percent load to eighty percent load, the control temperature can be maintained within about one degree F. The control range of the inventive thermostat utilizing the enhanced outdoor anticipation of the present invention would be applicable to a wide range of climates.

Figure 9:
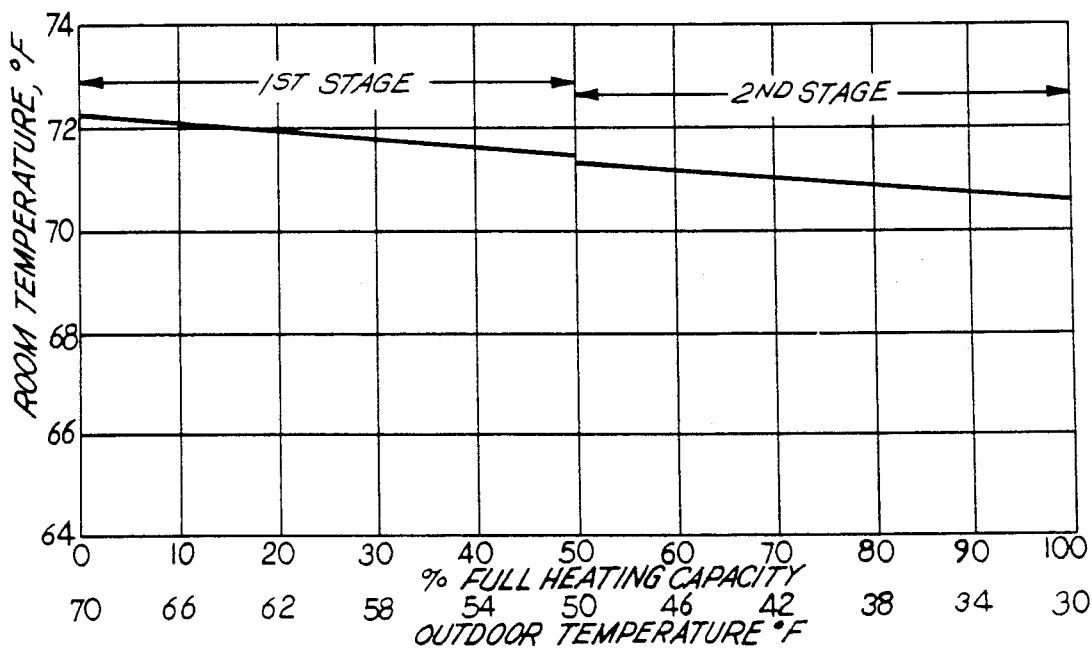
FIG. 9 is a graph similar to FIG. 5 representing the controlled room temperature over the range of 0 percent of heating capacity to 100 percent of heating capacity at an outdoor temperature of 70° F. to 30° F. for the thermostat of the present invention.

FIG. 9 illustrates the performance of the inventive thermostat of FIG. 7 when the minimum outdoor temperature is 30° F. It will be observed that this performance of the thermostat is virtually identical to that shown in FIG. 4, which is at a −40° F. ambient temperature. This represents a vast improvement in performance over that depicted in FIG. 5 where the enhanced outdoor anticipation of this invention is not used.

Figure 10:
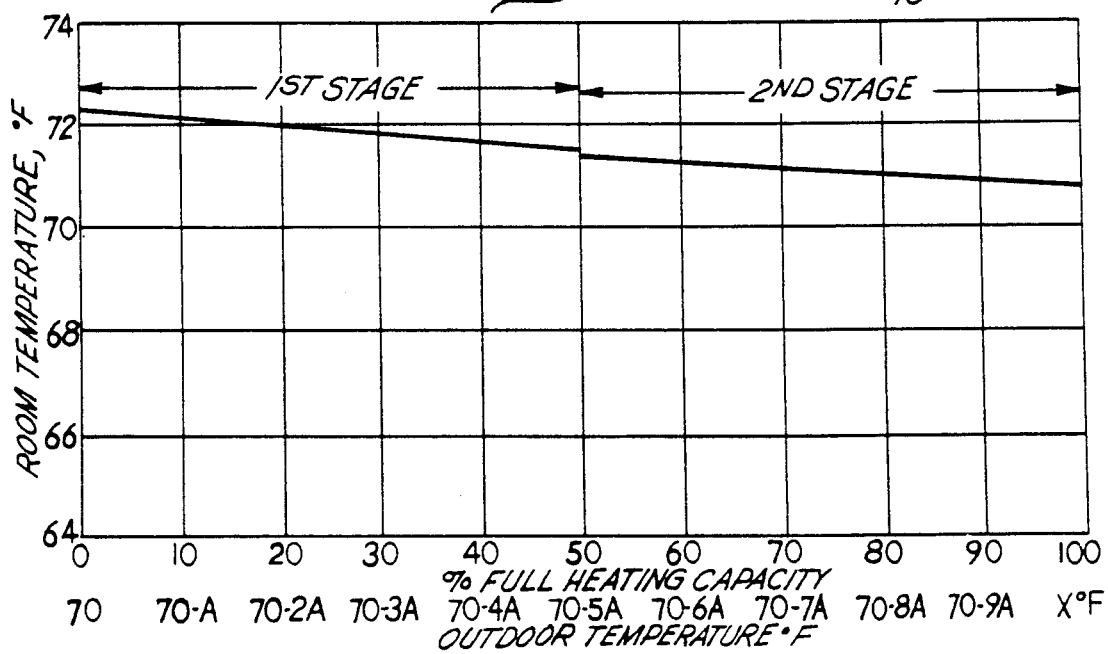
FIG. 10 is a graph similar to FIG. 4 representing the controlled room temperature over the range of 0 percent of heating capacity to 100 percent of heating capacity at a minimum outdoor temperature of 70° F. to X° F.

FIG. 10 is a graph illustrating a typical room thermostat with two stage heating utilizing the enhanced outdoor anticipation of the present invention. The graph displays the performance of the thermostat at any minimum outdoor temperature (X) where X is more than −40° F. and less than 30° F. A is equal to 70 minus X divided by 10. The first stage and the second stage of heating will operate within the parameters as shown in FIG. 9. For example, assuming an outdoor temperature of 30° F., the graph of FIG. 10 would correspond to that of FIG. 9. Assuming a minimum outdoor temperature of 0° F., then the values of outdoor temperature °F. along the (x) axis would be calculated as follows: at 10 percent of full heating capacity the outdoor design temperature would be 63° F., at 20 percent of full heating capacity the design outdoor temperature would be 56° F., at 30 percent of full heating capacity the outdoor design temperature would be 49° F. outdoor temperature, at 40 percent full heating capacity the outdoor design temperature would be 42° F., at 50 percent full heating capacity the outdoor temperature would be 35° F. At 60 percent full heating capacity the outdoor temperature would be 28° F., at 70 percent of full heating capacity the outdoor design temperature would be 21° F., at 80 percent full heating capacity the outdoor design temperature would be 14° F., at 90 percent of full heating capacity the outdoor design temperature would be 7° F., and at 100 percent full heating capacity the minimum outdoor design temperature would be to 0° F.

There has been provided by the present invention an improved thermostat for heat pumps or for heating and/or cooling systems which has enhanced outdoor anticipation so as to provide for more effective and comfortable operating conditions in the area to be conditioned over a wide range of outdoor ambient temperatures.

While I have shown and described a presently preferred embodiment of the present invention, it will be apparent that the invention may be otherwise embodied within the scope of the appended claims.

I claim:

1. A thermostat for controlling the temperature within a confined space comprising, system mode selector means for selecting heating, cooling or off modes of operation, blower mode selector means for selecting automatic or continuous modes of operation, first stage heating actuating means, a first stage heating anticipator associated therewith, second stage heating actuating means, a second stage heating anticipator associated with said second stage heating actuating means, first stage cooling actuating means, a first stage cooling anticipator associated with said first stage cooling actuating means, ambient compensating means and a resistance means in series therewith associated with said thermostat and means for providing enhanced outdoor temperature compensation comprising an outdoor compensating thermistor and a variable resistor in series therewith, said outdoor compensating thermistor and said variable resistor being disposed in parallel about said resistance means.

2. A thermostat as in claim 1 wherein the resistance means comprises a fixed resistor.

3. A thermostat as in claim 2 wherein the fixed resistor has a resistance of about 3.3K ohms.

4. A thermostat as in claim 1 wherein the ambient compensating means comprises a thermistor.

5. A thermostat as in claim 1 wherein the ambient compensating means comprises a negative temperature coefficient thermistor.

6. A thermostat as in claim 1 wherein the outdoor compensating thermistor is a positive temperature coefficient thermistor.

7. A thermostat as in claim 1 wherein the variable resistor is adjustable so as to compensate for minimum outdoor temperatures corresponding to about 30° F. to −40° F.

8. In a thermostat for controlling the temperature within a confined space said thermostat comprising a system mode selector means for selecting heating, cooling or off modes of operation, blower mode selector means for selecting automatic or continuous modes of operation, first stage heating activating means, a first stage heating anticipator associated therewith, a second stage heating actuating means, a second stage heating anticipator associated with said second stage heating actuating means, a first stage cooling actuating means, a first stage cooling anticipator associated with said first stage cooling actuating means, ambient compensating means and a resistance means in series therewith associated with said thermostat, the improvement characterized by means for providing enhanced outdoor temperature compensation comprising an outdoor compensating thermistor and a variable resistor in series therewith, said outdoor compensating thermistor and said variable resistor being disposed in parallel about said resistance means.

9. A thermostat as in claim 8 wherein the resistance means comprises a fixed resistor.

10. A thermostat as in claim 9 wherein the fixed resistor has a resistance of about 3.3K ohms.

11. A thermostat as in claim 8 wherein the ambient compensating means comprises a negative temperature coefficient thermistor.

12. A thermostat as in claim 8 wherein the outdoor compensating thermistor is a positive temperature coefficient thermistor.

* * * * *